(No Model.)
E. A. EDWARDS.
ANEMOMETER
No. 315,261. Patented Apr. 7, 1885.
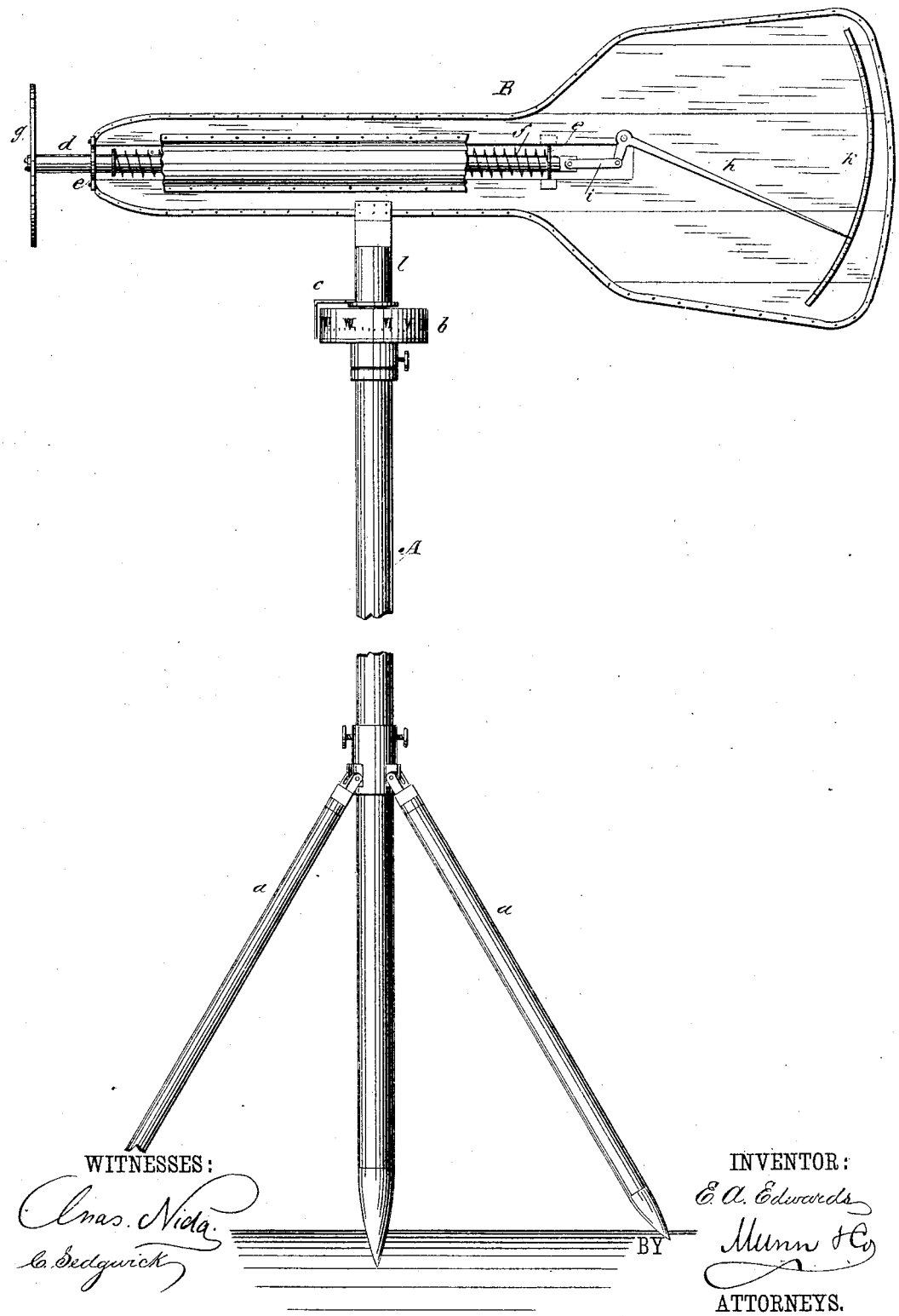

UNITED STATES PATENT OFFICE.

EATON A. EDWARDS, OF FORT MEADE, DAKOTA TERRITORY.

ANEMOMETER.

SPECIFICATION forming part of Letters Patent No. 315,261, dated April 7, 1885.

Application filed June 6, 1884. (No model.)

*To all whom it may concern:*

Be it known that I, EATON A. EDWARDS, of Fort Meade, in the county of Lawrence and Territory of Dakota, have invented a new and useful Improvement in Anemometers, of which the following is a full, clear, and exact description.

The object of my invention is to furnish a simple and inexpensive device for determining with approximate accuracy the velocity of the wind at the moment of observation, and particularly adapted for use of riflemen at target practice. For that purpose I make use of a pressure-disk on a spindle that is arranged to operate a pointer, and these are combined with a vane, and with means for indicating the direction of the wind with reference to the target, all as hereinafter described and claimed.

Reference is to be had to the accompanying drawing, forming a part of this specification, in which my improved wind-gage is shown in elevation.

The post or stake A has folding braces $a$, when made for field use, of any suitable arrangement for firmly supporting the post. The vane B has a thimble, $l$, stepped on the top of the post to allow free rotation of the vane, and the thimble carries a pointer, $c$, arranged to move in connection with a numbered dial, $b$, for indicating the direction of the wind with reference to the target or other fixed point—that is to say, the apparatus being set so that the vane points to the target when pointer $c$ is at the zero-point, the position at right or left will indicate the angle at which the wind blows across the line. In a slot running lengthwise of the vane is a spindle, $d$, supported in bearings $e$ $e$, so that it may slide endwise. Around the spindle is a spiral spring, $f$, that takes behind a collar on the spindle, and on the projecting end of the spindle is a disk, $g$, the area of which is a convenient part of a square foot. On the larger end of the vane is pivoted a pointer, $h$, that connects by a link, $i$, with spindle $d$, and a fixed quadrant, $k$, properly graduated, is arranged for the outer end of the pointer to move over. The pressure of the wind on disk $g$ causes inward movement of the spindle, and that in turn swings the pointer so that it indicates on the scale the velocity of the wind, calculated from the pressure in pounds per square foot, at any moment. In this form the apparatus is adapted for the use of riflemen and others, and though not strictly accurate in its results, will serve all practical purposes.

The pointer or indicator need not be on the vane, and any special form of indicator may be used.

When applied to a vane on a building, the indicator may be at any place desired.

Having thus described my invention, I claim as new and desire to secure by Letters Patent—

1. An anemometer consisting, essentially, of a vane, a longitudinally-moving spindle mounted thereon, a pressure-disk mounted at one end of said spindle, a pointer connected with the end of the spindle opposite the disk, and a dial, substantially as described.

2. In an anemometer, the sliding spindle $d$, spring $f$, disk $g$, and an indicating device, in combination with vane B, substantially as shown and described.

3. The combination, with a vane, of disk $g$, sliding spindle $d$, spring $f$, and pointer $h$, movably connected to that end of the spindle opposite the disk, substantially as described, for operation as specified.

4. The combination, with the standard A, provided with a dial, $b$, of the anemometer-vane pivoting on said standard, and the pointer $c$, connected therewith and extending to the face of the dial, substantially as set forth.

EATON A. EDWARDS.

Witnesses:
GEO. H. CAMERON,
B. O. SPILMAN.